United States Patent [19]

Sawyer

[11] 3,936,188

[45] Feb. 3, 1976

[54] COLOR SORTING OF IRRADIATED MATERIALS AND A CALIBRATED COLOR COMPARISON ARRAY

[75] Inventor: Baldwin Sawyer, Gates Mills, Ohio

[73] Assignee: Sawyer Research Products, Inc., Eastlake, Ohio

[22] Filed: Feb. 25, 1974

[21] Appl. No.: 445,475

Related U.S. Application Data

[63] Continuation-in-part of Ser. No. 303,857, Nov. 6, 1972, Pat. No. 3,837,826.

[52] U.S. Cl. ........................ 356/36; 65/29; 65/30 R; 209/111.6; 356/173; 356/191; 356/243

[51] Int. Cl. ........................... G01n 1/00; G01j 1/02

[58] Field of Search ............. 356/36, 173, 179, 191, 356/192, 193, 194, 243; 209/111.6; 65/29, 30

[56] References Cited

UNITED STATES PATENTS

| | | | |
|---|---|---|---|
| 3,333,503 | 8/1967 | Anderson et al. | 356/36 |
| 3,482,686 | 12/1969 | Wood | 309/111.6 |

*Primary Examiner*—Vincent P. McGraw
*Attorney, Agent, or Firm*—Donnelly, Maky, Renner & Otto

[57] ABSTRACT

Methods of isolating quartz, quartzite, glass or silicate materials having selected aluminum contents are described. The non-destructive method comprises subjecting the materials to ionizing irradiation for a period of time and at an intensity (preferably uniform) sufficient to develop the several distinctive color centers of the materials containing aluminum ions. According to the ions associated with the aluminum ions, the depth of color of each of the various tints developed corresponds to the amount of aluminum in said crystals. The colored crystals which correspond in tint and depth of color to the aluminum contents outside the desired content range can be separated. In this manner, aluminum free quartz, quartzite, glass or silicate materials can be isolated if present in a mixture, or fractions of such materials can be selected, each containing a uniform and known aluminum content.

12 Claims, No Drawings

COLOR SORTING OF IRRADIATED MATERIALS AND A CALIBRATED COLOR COMPARISON ARRAY

CROSS REFERENCE TO RELATED APPLICATION

This application is a continuation-in-part of application Ser. No. 303,857, filed Nov. 6, 1972, now U.S. Pat. No. 3,837,826.

BACKGROUND OF THE INVENTION

This invention relates to a process for identifying and isolating quartz, quartzite, glass or silicate materials having selected aluminum contents. More particularly, the invention relates to a non-destructive method for determining the aluminum contents of said materials.

Aluminum is an important impurity which is found in quartz, quartzite, glass or silicate materials. In natural quartz, aluminum is one of the major impurities, the others being iron, titanium, sodium, lithium and hydrogen. The impurities in, for example, natural quartz, affect products made from it, both in cultured quartz growing and in the manufacturing of fused quartz, where high-purity products are often desired. It has been possible to segregate many of the impurities other than aluminum by physically eliminating from the lump all foreign materials adhering to the lump surfaces or included within the lumps. Most iron and titanium are effectively removed by this method. The main surface-absorbed impurities, sodium, lithium and metallic iron (but not their dissolved fractions) may then be removed by an acid wash. In the fused quartz industry, acids such as hydrochloric and hydrofluoric acid are commonly used for such an acid wash.

Aluminum, however, has been particularly difficult to revome as an impuirty in quartz because it is usually dissolved in the quartz and pure lumps cannot (until now) be separated from impure lumps by any known, non-destructive, practical technique.

The presence of aluminum in raw natural quartz has been a problem in cultured quartz growing processes because the aluminum dissolves in the hydrothermal fluid and affects several properties of the crystals grown from that fluid. The presence of aluminum in the fluid affects the following crystal properties as indicated: Q is decreased (see IEEE Trans. on Sonics and Ultrasonics, Vol. Su-19, No. 1, January, 1972, pages 41–44); the relative sizes of chamfer or S faces are increased; X/Z growth ratio is increased; and the tendency toward creating crevicing flaws is increased. While lithium doping of the hydrothermal solution can be used to control partially the first two of these undesirable properties, sorting of the raw material to control the aluminum content within acceptable appropriate tolerance limits remains the most desirable control method for these problems.

In the fused quartz industry, the control of the variable aluminum content is equally, or more, important. For example, where the fused quartz crystals are to be applied to optical uses, the fused quartz must be homogeneous. It has been observed that if lumps or particles of quartz having different aluminum contents are fused together, the resulting fused quartz will not have a uniform optical index, and the material cannot be used without a long and costly final anneal.

Another type of impurity which can cause problems in fused quartz applications is the alkali metals. It has been found that alkali-bearing quartz is more prone to devitrification. Therefore, in fused quartz applications where devitrification is a problem, uncontrolled alkali-bearing lumps of quartz should not be utilized.

It has long been known that natural quartz crystals turn smoky under the influence of X-rays or gamma rays, some more and some less. Kats (Thesis, Delft (1961), see also "Hydrogen in Alpha-Quartz," *Philips Research Reports*, 17:201–279 (June, 1962) appears to be the first to explicitly describe the yellow shade that some lumps develop, and to note that these contained more OH than the others. Bambauer (*Schweiz. Min. Petr. Mitt.*, 41:335 (1961) studied the relationships of the saturated colors to impurities and stated that the aluminum ions were compensated by the sum of monovalent impurities as in Al=Na + Li + H.

Lehman studied further the yellow color center called "honey" ("Yellow Color Centers in Natural and Synthetic Quartz," *Phys, kondens. Materie*, 13:297–306 (1971).

SUMMARY OF THE INVENTION

These and other problems have been overcome by providing a method of sorting and selecting raw quartz, quartzite, glass or silicate materials containing from 0 to 1000 ppm of aluminum into fractions having selected aluminum contents. The method comprises subjecting said minerals to ionizing radiation for a given period of time and at a known intensity sufficient to cause the several distinctive colorations due to the aluminum and other impurities present to approach saturation, and sorting the irradiated materials into fractions based on their various tints and depth of color. Preferred examples of irradiation include gamma or X-ray radiation. By this method, fractions of quartz, quartzite, glass or silicate materials can be obtained bearing selected and known amounts of aluminum or almost no aluminum at all, and controlled levels of alkali content, if needed.

DESCRIPTION OF THE PREFERRED EMBODIMENTS

The materials to which the method of this invention may be applied include quartz, quartzite, glass or silicate materials containing from 0 to 1000 parts per million of aluminum. The invention is particularly applicable to quartz crystals which may be either naturally-occurring quartz crystals or grown crystals. Accordingly, the following discussion will be directed to the use of the invention with quartz crystals, although the discussion may be equally applicable to quartzite, glass and silicate materials containing low aluminum.

It has now been discovered that when quartz crystals containing some aluminum are subjected to ionizing radiation, the crystals undergo a color change depending mainly on the amount of aluminum present therein, but also on other impurities associated with the aluminum. The particular color generated depends mainly on the monovalent impurities which are associated with the aluminum present in the crystals, such as sodium, lithium and hydrogen. The particular color generated also depends on the crystallographic growth direction in which the crystal originally grew. In natural quartz this is nearly invariably rhombohedral, which fact tends helpfully to improve the consistency of colorations in natural quartz. It has been discovered that the color obtained will differ depending on whether the aluminum ions are compensated mainly by alkali metal ions, such as sodium or lithium, or compensated in addition by hydrogen. More specifically, it is found that aluminum compensated by alkali metals results in a smoky, gray color base whose broad absorption band centers around 460 mμ (blue), whereas aluminum whose compensation is increasingly by hydrogen results in an increasingly yellow tint whose absorption is greatest in the ultraviolet (under 200 mμ). When intermediate mixtures of alkali and hydrogen compensate the aluminum, mixed tints of yellow and gray (brown) result. Iron hydroxide in the quartz also produces a yellow color without irradiation, known as citrine. To avoid confusion, it is preferable to exclude such citrine before irradiation.

At any given radiation dosage, the intensity of each color obtained is dependent on the relative amount of aluminum present in the crystals. Thus, crystals containing higher amounts of aluminum have a deeper coloration of the same tint, but differing tints appear at different densities for the same aluminum contents, the visible yellow tints being notably paler than the gray shades for corresponding aluminum contents.

The irradiation method, therefore, provides a technique for sorting and separating quartz crystals into batches having selected aluminum contents or containing almost no aluminum at all. The technique also provides a method for selecting quartz crystals containing aluminum compensated mainly by alkalis from crystals containing aluminum compensated in large proportion by hydrogen. The yellow, hydrogen-bearing quartz crystals are less prone to undergo devitrification after fusing and may, therefore, be useful particularly for such fusing applications if their aluminum content is controlled to appropriate levels uniform in each batch. The gray, on the other hand, show the greatest visible color density per aluminum content coefficient; hence, they afford the greatest selectivity to visual sorting by this method.

Examples of ionizing radiation useful in the methods of the invention include gamma rays and X-rays. Gamma radiation is preferred since it is more penetrating and will generate the desired coloration uniformly throughout the crystal being irradiated. Gamma rays from cobalt-60 are generally used since cobalt-60 is today a readily available isotope material, and its rays are highly penetrating and so tend to produce more uniform exposures than X-rays produce.

Irradiation of the crystals at a dosage of from about 0.2 up to about 10 megarads has been found to provide various satisfactory coloration levels. The recommended irradiation dosage will depend on the particular kinds of material being treated, the sort sensitivity desired, and the extent of the impurities therein. It has been found that for the same impurity level, the greater the dosage, the darker the colors obtained, although the colors begin to saturate around 1.5 megarads. Either very dark or very light coloration can reduce the visual discrimination. In general, an irradiation dosage of about 1.5 to 2.5 or 5 megarands has been found particularly useful when applied under normal conditions to transparent natural quartz crystals.

The materials treated in accordance with this invention should be exposed to the irradiation for a period of time that will depend on the source strength. For example, in a vault that exposes at 50,000 rad per hour, an exposure period of about forty hours will produce an irradiation dosage of about 2.0 megarads, which is preferred for many applications.

The technology of gramma irradiation with the gamma rays produced by cobalt-60 isotope by-product material from nuclear reactors has been well developed for use in sterilizing medical equipment, food, etc. There are several installations in both North America and Europe that perform such radiation treatment on a service basis. Alternatively, a large volume user can install his own source inside a shielding vault (for protection of personnel), and perform the irradiation under his own control of dosage and its uniformity.

As mentioned above, the various tints and depths obtained by the uniform irradiation procedure reflect the nature and amounts of impurities in the crystals being treated. Accordingly, the invention provides a non-destructive technique of sorting quartz lumps intended for use as raw materials. The physical colors after irradiation, when appropriately sorted, are very sensitive indicators of impurities, and, in fact, can be more sensitive than normal spectrographic analysis techniques. The irradiation process can be used to select the highest purity lumps of quartz which show a minimum of color after irradiation, and also to segregate or remove those containing excessive levels of undesirable impurities such as aluminum and alkali metals.

A method of the invention has been used for beneficiating raw lascas supply batches of hydrothermal growth in which the object is to obtain a moderate average aluminum content in each batch. Another method can be used in a similar way to beneficiate supplies for melting into fused quartz.

Sorting of the irradiated lumps may be done by automatic machines which sort discriminate on the basis of color. Such machines are commercially available for quantity sorting of solid bodies such as beans, peas, lump minerals, etc. These machines normally view the illuminated body through a filter by means of a lens and electric eye system. For best gray center discrimination, a blue filter at 460 to 466 mμ will serve, although care is needed in trading off density of a filter against intensity of illumination and the speed of viewing response, which affects the practical sort running speed of the machine. This consideration normally operates to prefer a pale blue, broad filter to a deep blue monochromat filter.

The considerations on sorting for the yellow color are somewhat different. This color is visible to eyes because of its violet absorption peak at 400 mμ which means that eye sorting is discriminating on the basis of this weak absorption. The discrimination for this color center increases the farther the observed colors are moved into the ultraviolet toward 200 mμ. Lenses of regular optical glass transmit the long ultraviolet range: 320 to 400 mμ. Special quartz lenses are necessary to transmit the middle ultraviolet (280 to 320 mμ), and most of the short wave or "far" ultraviolet, in addition to the long wave ultraviolet and visible. "High pressure" mercury lamps yield good illumination in both blue and ultraviolet wavelengths.

If visual hand sorting is used, the cost of 100 percent sorting as above may be higher than necessary when it is the average impurity content of a batch that is to be controlled. It has been found that most of the cases in which number one or number two lascas quartz is shipped from Brazil contain a relatively uniform mix of lump colors within each case. Accordingly, a sampling plan is utilized by which a 5 percent sample is taken from each case, irradiated, and sorted into the selected color categories, namely, color free, yellow, light smoky, medium smoky, dark smoky, and mixtures of yellow and smoky. A rough figure of merit is computed by summing the weight percentages of all the lumps classed in the low aluminum categories: color free, light smoky, medium smoky and light mixed. In practice, a general correlation has been found between this figure of merit and low aluminum content. For this reason, it is practical to retain control over total batch aluminum content by blending in each batch cases whose sorted figures of merit average at an appropriately selected target.

Sorting for fusing purposes differs in details but not in principle. When the objective is to fuse batches each having uniform aluminum contents, it is necessary to irradiate uniformly and sort a large quantity of clean, clear quartz in order to obtain enough lumps for one batch of each usable color gradation. The uniformity of aluminum desired in each batch will determine the range of color depth to be allowed in each category. At first it is necessary also to separate by tints on the gray-yellow color scale because of the varied coefficients of aluminum content to color depth of the various tints. In other words, each batch to be fused will consist essentially of lumps having one tint and one depth of that tint. The small range of tint and tint depth to be allowed in that batch will depend on the uniformity required of the batch. Lumps having varied tint or tint depth within one lump will pose a problem; if the variation is severe enough to lump must either be broken into smaller pieces or discarded. Variations in lump size may also pose problems in matching of tint and tint depth. Best results are obtained from sorting lumps whose size range is minimized.

In addition to controlling aluminum content, it is also possible to select for low alkali content by preferring either the light smoky to color-free material (which can be sorted well visually), or the pale honey material. The latter can be sorted for aluminum content visually with much lower selectivity than can the smoky material, but it is subject to more sensitive sorting by a machine sort selecting by ultraviolet light.

Probably the main limitation on the capability of this invention when used to sort natural quartz lumps is the natural quartz itself. Since their impurity contents are unchanged by the irradiation treatment, it will now be possible to get output lumps any purer or more uniform than those that are the input to the process. The fact that a great majority of natural quartz was initially grown on rhombohedral faces helps insure a general reproducibility of the relationships between tint, depth of tint, and impurity contents.

When applying the invention either for 100 percent sorting or sample sorting, it is worth selecting for preference those mine sources or deposits that yield a high proportion of their lumps in the sort categories that are desired. In other words, the invention is just as useful in selecting preferable natural deposits as it is in selecting individual lumps. Even before this inventin, evidence of varied general impurity levels in quartz from different mines and different general localities was known in the trade. Mines in the Minas Gerais state of Brazil enjoyed a preference over those in Bahia state as tending to yield a higher purity. Madagascar quartz was known to have its own peculiarities, etc.

As a part of the evaluation of this invention, the product lascas from about twenty individual mines in various localities in Brazil was evaluated for its irradiated color sort properties, its impurity content, and its behavior in hydrothermal growth runs. In addition, quartzite from about twelve assorted deposits in North America was similarly evaluated. In general, very wide variations in the test results were found, and about half the localities were dropped from further tests on the basis of their very deep radiation blackening and their high aluminum contents (500 to 1000 ppm). Accordingly, all of the data in the examples should be regarded as based on natural lascas from thoroughly screened sources selected for their low aluminum contents. The invention is much more positive and selective with materials containing more aluminum, and such quartz or quartzite material is by far more common throughout the earth. The problem has been to find a consistent, moderately low level of aluminum rather than medium to high ones. However, these are readily available if needed, and also can be readily selected by the methods of this invention.

If a mine can be found whose output comes close to matching the input required for a batch process, then sampling methods are likely to suffice for control. However, if the product required is a low fraction of the mine output, e.g., the highest purity fraction running perhaps five to ten percent, then 100 percent sorting will be required.

The high uniformity requirement for fusing quartz batches is more stringent than for hydrothermal growth. The limit on uniformity attainable by sorting material from one mine is set first by the nature of the lumps yielded from that mine, especially by the normal variation experienced within each lump from that mine. For best results, all controllable variables in the process should be controlled. These include the radiation dosage uniformity from lump to lump, the sizes of the lumps being directly compared, and the tint balance of the group being compared for tint density.

The method of the invention can also be extended to include determining the approximate aluminum contents of initially colorless and smoky quartz materials containing from 0 to about 100 ppm of aluminum. This rapid and non-destructive method comprises the steps of irradiating particles (lumps, pieces, stones, etc.) of the material with ionizing radiation at a given known dosage to cause the distinctive color centers to develop; measuring the amount of overall residual color (mixtures of gray plus yellow) in each particle of irradiated material; measuring the proportion of yellow color in each particle of irradiated material; and comparing the amount of total color and the proportion of yellow determined for each particle, respectively, to color standard samples (which could conveniently be of known aluminum content irradiated at the same dosage) from which the aluminum content of the particle is interpolated. More particularly, the step of measuring the amount of overall residual color includes the step of classifying the irradiated particles in color classifications according to the percentage of overall residual color therein on an appropriate scale such as from 0 to 100 percent light absorption or color density, and wherein the step of measuring the amount of yellow color includes the step of determining the proportion of yellow color within each gray plus yellow color classification on a selected scale such as from 0 to 100 percent. As mentioned, any appropriate scale can be utilized for measuring the relative amounts of color. In addition to the scale of from 0 to 100 percent, it is possible to use various others including logarithmic absorbance represented on a scale of from zero to infinity.

In one method of the invention, the aluminum content of each irradiated particle which is classified as indicated above for amount of overall residual color density and then subclassified for amount of yellow color within each classification is computed by substituting the measured amount of overall total residual color density and the proportion of yellow color in each particle into a formula derived from standards of the same type of material treated to the same dose.

In another example of the method of this invention for determining the approximate aluminum content of colorless and smoky quartz, quartzite, glass or silicate material containing small amounts of aluminum, such as from 0 to about 1000 ppm, a plurality of particles of one of said materials having a range of aluminum content, such as, for example, quartz, are irradiated with ionizing radiation for a measured period of time and at a known intensity to provide a dosage sufficient to cause the distinctive color centers to develop in the quartz. A comparison array of such irradiated particles if formed by classifying the same as to percent overall residual color, total density, and percent yellow color although other scales can be utilized depending on the method of determining the amount of color. For example, if the amount of color is to be determined on equipment designed to measure the absorption of light, a scale of from 0 to 100 percent is appropriate whereas if the transmission of light is utilized as a measure of color, then a scale of from 100 to zero could be used for particles ranging from no color (complete transmission) to very densely colored particles (no light transmission). The comparison array is conveniently arranged in two dimensions with one coordinate representing the amount of overall color on a scale of from, for example, 0 to 100 percent and the other coordinate representing the porportion of yellow on a scale of from, for example, 0 to 100 percent.

After the comparison standard array is prepared, one or more samples of irradiated quartz matched to selected samples in the array, or interpolated between them, is analyzed to determine its aluminum content. For such determinations, the aluminum content in said classified samples in the array is related to the color percentage coordinates. Thus, when another sample of the same material with an unknown aluminum content is irradiated with ionizing irradiation at the same dosage as that utilized in treating the samples used for the preparation of the comparison standard array, the percent overall residual color and the percent yellow color developed in the sample can be readily determined by comparing and interpolating the sample's color density and tint with the quartz particles in the comparison standard array. This comparison not only facilitates the determination of the percent overall residual color and percent yellow in each sample but also enables one to readily compute the amount of aluminum in the given sample since the aluminum contents of the standard samples of the comparison array already have been determined.

In another method of the invention wherein a complete comparison array may not be obtainable due to the limitations of the natural source of the quartz or other material, such as quartzite, glass, silicate materials, thus making it difficult to analytically determine the aluminum content of a large number of standards of varying aluminum content, the comparison array of the type described above is prepared with as many varying standard samples as possible, and the aluminum content of these standard samples is determined analytically providing a correlation between percent color, percent yellow and the amount of aluminum present within a given particle. Based on this information, mathematical formulas can be developed expressing the relationship determined between the amount of aluminum and the percent overall color and percent yellow color. For example, as illustrated in the example to follow, the formula which was derived for computing the aluminum content of Brazilian lascas quartz containing from 0 to about 500 ppm of aluminum as a function of percent color and percent yellow, after irradiation to a dosage of about 2.0 to about 2.2 megarads, is as follows:

$$\text{Aluminum (ppm)} = 6.5 + 440 \left(\frac{\%\ \text{Color}}{100}\right)\left(\frac{\%\ \text{Yellow}}{100}\right)^3$$

Once the formula such as given above is developed for a given type of quartz treated at a given dosage, the aluminum content of other samples of similar source quartz treated at the same dosage can be determined readily by establishing the percent overall residual color and the percent yellow color in the irradiated sample by reference to the same comparison standard array and thereafter substituting these percentages in the same formula. This method provides a rapid and non-destructive method for determining the approximate aluminum content of quartz samples, within an accuracy that can also be determined from experience, if desired.

The following examples illustrate methods of utilizing the invention:

EXAMPLE 1

A batch of 8800 pounds of number one Brazilian lascas quartz is irradiated to a 1.2 megarad dose utilizing gamma rays from a cobalt-60 source. Various tints and color densities are formed in the quartz lumps and the lumps are segregated by tint and density. A visual overall tint analysis of all the lumps gives the following percentages:

TABLE I (Visual Tint Analysis)

| Color | Amount (%) |
|---|---|
| Color free | 0.1 |
| Yellow (mostly medium) | 2.0 |
| Smoky (Gray) | |
| Light | 20.0 |
| Medium | 40.0 |
| Dark | 6.0 |
| Mixed (Smoky and Yellow) | |
| Light | 16.0 |
| Medium | 12.0 |
| Dark | 4.0 |

EXAMPLE 2

Over 10,000 lb. quantity batches of number 1 and of number 2 Brazilian lascas quartz were irradiated with cobalt-60 gamma rays to a total dose for each particle ranging from 2.0 minimum to 2.2 maximum megarads. Particle or lump sizes ranged from about 10 to about 25 grams each. From the large number of particles in each batch a standard color array from each batch was collected covering the various densities of total color and proportion of gray and yellow represented. The particles in each array were arranged in two dimensions on a white surface with a light placed underneath to illuminate the surface and the particles of the array, the dimensions being percent total Color (ranging from 0 meaning no color to 100 meaning opaque) and from 0 to 100 percent Yellow (of the gray and yellow blend).

The number of particles placed in an array will depend on two major factors: (1) the precision or resolution required in the sortings that are to be made, and (2) the kinds and limits of the color tints and densities actually found in the batches being sorted. In the actual array of this example, the full color depth scale from 0 to 100 percent was divided into 5percent increments meaning 21 total gradations or positions (0, 5, 10 percent, etc.). The yellow proportion scale was divided into 10 percent increments, meaning 11 total gradations or positions (0, 10, 20 percent, etc.). Thus, each whole array had 11 × 21 or 231 positions of which only about 120 positions were filled in each because the batches of irradiated particles yielded no lumps of the tints or densities that belonged in about 110 positions. There were no filled positions on the 100 percent density line and there were no particles in the corner near 100 percent yellow and 100 percent density. As this array was made the exact gradation used depended on the perception of a human eye and might not match the choices made by another eye or by an electric eye. The intended functioning of this method does not depend on the exact gradation used in the standard array so long as it remains fixed and unchanged throughout its use.

The next step is to select particles for analysis whose color tints and densities are either matched to individual lumps in the standard array or interpolated between them. The coordinates for each lump to be analyzed are determined and recorded.

About 50 particles of lascas 1 and 20 particles of lascas 2 were analyzed for aluminum (Al) (and other impurities). The analysis result of all these ranged from a low of 1ppm to a high of 269ppm Al by weight. The Al results, together with their associated co-ordinates of percent Color and percent Yellow, were analyzed on a computer regression program and best fitted by the formula:

$$\text{Al (ppm)} = 6.5 + 440 \left(\frac{\%\ \text{Color}}{100}\right)\left(\frac{\%\ \text{Yellow}}{100}\right)^3$$

which was found to account for 83 percent of the actual variation in the observed Al content. Hence, while the observed correlation was not perfect, it was sufficient to demonstrate a real ability of the technique as used to yield useful Al content predictions from the observable color tint and density information.

Regarding the method for the effects of possible errors, it is noteworthy that a relatively small error in percent Yellow will have a large effect on the formula because of the exponent 3. Accordingly, improvement in the precision of percent Yellow measurement can be expected to contribute to improved Al predictions. This measurement is especially difficult when percent color is either very high or very low. If many lumps fall in either of these categories, it may be advisable to either decrease or increase, respectively, the irradiation dose level in order to place more lump colors into the more sensitive sorting range of percent Color. Of course, this change implies recalibrating the standard and a revision in the formula in the aluminum content.

The information available about aluminum content also yields some information about other impurities especially Li + Na + H whose sum, on an atomic basis, compensates for the atomic charge carried by each aluminum atom into the quartz lattice when it substitutes for a silicon.

In our experience, a low aluminum quartz or quartzite tended to be low in Li, Na, Na, H and all other impurities as well. When the aluminum increased, the Li content increased more than the sodium content.

EXAMPLE 3

A batch of number 1 Brazilian lascas quartz is irradiated as described in Example 2 and the lumps are separated according to the various densities of total color and proportion of gray and yellow by comparison with the standard color array prepared in Example 2. The aluminum content for each lump is then calculated by using the formula given in Example 2 and inserting the percent Color and percent Yellow in the formula.

The above examples illustrate the non-destructive procedures of the invention for separating quartz, quartzite, glass or silicate materials into fractions having similar aluminum content into fractions having the aluminum compensated mainly by alkali metals or compensated in addition by hydrogen, and into fractions having known aluminum content. Such selection is important in applications such as crystal fusing or crystal growing where aluminum is an important impurity and the nature of the compensation can affect the properties of the fused and grown crystals.

Cultured quartz differs from natural quartz in its irradiation coloring behaviors because a grown bar consists almost entirely of X and Z growth regions, and almost none of the rhombohedral growth of which natural quartz is mainly composed. The radiation behavior of cultured quartz is typified by the sections reported in Figure One of the publication "Quality in Cultured Quartz," published by Sawyer Research Products, Inc., Eastlake, Ohio, 1965. In these it is seen that the Z growth regions resist darkening almost completely, while the X regions do darken to varying degrees, depending generally upon the concentration of aluminum in the hydrothermal solution and also on the growth rate. In this case the Z material is not nearly free of aluminum as its lack of color suggests, but rather it contains approximately half the concentration of aluminum that the + X region contains.

Accordingly, the methods of this invention can be used to yield useful information about cultured quartz, but the color signs must be interpreted differently from those of natural quartz. In general, the color in a Y section sample from a run is a useful indicator of the general aluminum level in the quartz of that run.

The embodiments of the invention in which an exclusive property or privilege is claimed are defined as follows:

1. A rapid and non-destructive method for determining the approximate aluminum content of colorless and smoky quartz, quartzite, glass or silicate materials containing from 0 to about 1000 ppm of alluminum which comprises the steps of:

a. irradiating particles of said material with ionizing radiation of a measured period of time and at a known intensity sufficient to cause the distinctive colorations that occur in such material containing aluminum, b. measuring the amount of overall residual color in each particle of irradiated material, c. measuring the proportion of yellow color in each particle of irradiated material, and d. comparing the amount of color and the proportion of yellow determined in each particle in steps (b) and (c) to color standards of measured aluminum content irradiated at the same dosage, whereby the aluminum content of the particle is determined from its measured color properties.

2. The method of claim 1 wherein the step of comparing comprises substituting the amount of overall residual color and the proportion of yellow color in a formula derived from standards of similar material treated to the same dose based on the amount of overall residual color and the proportion of yellow color.

3. The method of claim 2 wherein the dosage is from about 2.0 to 2.2 megarads and the material is quartz.

4. The method of claim 1 wherein the step of measuring the amount of overall residual color includes the step of classifying the irradiated particles in color classifications according to the amount of overall residual color therein on an appropriate scale, and wherein the step of measuring the amount of yellow color includes the step of determining the amount of yellow color within each total overall color classification on an appropriate scale.

5. The method of claim 4 wherein the step of comparing comprises substituted the amount of overall residual color and the proportion of yellow color into a formula derived from standards of similar materials treated to the same dose.

6. A rapid and non-destructive method for determining the approximate aluminum content of colorless and smoky quartz, quartzite, glass or silicate material containing from about 0 to 1000 ppm of aluminum which comprises the steps of:

a. irradiating particles of said material with ionizing radiation for a measured period of time and at a known intensity sufficient to cause the distinctive colorations that occur in such materials containing aluminum, b. separating and classifying said irradiated particles according to overall residual color on an appropriate scale, c. further separating and classifying the classified particles obtained in step (b) according to the relative amount of yellow color within each particle of said material on a second appropriate scale, and d. comparing said classified and subclassified particles with an array of calibrated standard color particles to determine the aluminum content of each sample utilizing the amount of overall color and the amount of yellow color of each particle to indicate the aluminum content thereof.

7. The method of claim 6 wherein the aluminum content of the calibrated standard color particles utilized in step (d) is known.

8. The method of claim 6 wherein the aluminum content of each irradiated particle classified and subclassified in steps (b) and (c) is determined by substituting the amount of overall residual color and the amount of yellow color in each particle in a formula derived from standards treated to the same dose.

9. A rapid and non-destructive method for determining the approximate aluminum content of colorless and smoky quartz, quartzite, glass or silicate material containing from 0 to about 1,000 ppm of aluminum which comprises the steps of:

a. irradiating a plurality of particles of said materials with ionizing radiation for a measured period of time and at a known intensity sufficient to cause distinctive colorations therein, b. forming a comparison array of such irradiated particles by classifying the same as to percent overall residual color and percent yellow color, c. analytically determining the aluminum content of one or more samples matched to each sample in the array wherein the aluminum content of each of said classified samples is related to such color percentages, d. irradiating samples of similar material of unknown aluminum content with ionizing radiation for the same period of time and at the same intensity as in step (a) to cause the distinctive colorations that occur in such material containing aluminum, and e. comparing the sample of irradiated material from step (d) with said comparison array to determine the aluminum content thereof.

10. A rapid and non-destructive method for determining the approximate aluminum content of colorless and smoky Brazilian lascas quartz containing from about 0 to about 500 ppm of aluminum which comprises the steps of:

irradiating a plurality of particles of said materials with ionizing radiation with a dosage of from about 2.0 to about 2.2 megarads to cause the distinctive colorations that occur in such material containing aluminum, b. separating and classifying said irradiated materials according to overall residual color on a scale of from 0 to 100 percent residual color, c. further separating and classifying the classified materials obtained in step (b) according to the relative amount of yellow color within each sample of said material on a scale of from 0 to 100 percent yellow color, and d. computing the aluminum content of each classified and subclassified particle according to the formula $$\text{Aluminum (ppm)} = 6.5 + 440 \left(\frac{\%\,C}{100}\right)\left(\frac{\%\,Y}{100}\right)^3$$

wherein percent C represents percent overall residual color and percent Y represents percent yellow color in the sample.

11. A calibrated color comparison array of irradiated samples of colorless or smoky quartz, quartzite, glass or silicate material containing from about 0 to about 1000 ppm of aluminum wherein a plurality of such samples irradiated at a given intensity for a given period of time are classified as to percent overall residual color and percent yellow color and arranged in two dimensions wherein one coordinate represents percent overall color on a scale from 0 to 100 percent and the other coordinate represents percent yellow color on a scale of from 0 to 100 yellow.

12. The array of claim 11 wherein the aluminum content of the various samples is known.

* * * * *